United States Patent [19]

Lamming

[11] Patent Number: 5,535,063
[45] Date of Patent: Jul. 9, 1996

[54] REAL TIME USER INDEXING OF RANDOM ACCESS TIME STAMP CORRELATED DATABASES

[75] Inventor: Michael G. Lamming, Cambridge, Great Britain

[73] Assignee: Xerox Corporation, Stamford, Conn.

[21] Appl. No.: 378,914

[22] Filed: Jan. 26, 1995

Related U.S. Application Data

[63] Continuation of Ser. No. 819,258, Jan. 10, 1992, abandoned.

[30] Foreign Application Priority Data

Jan. 14, 1991 [GB] United Kingdom .................. 9100732

[51] Int. Cl.[6] .................................................. G06F 19/00
[52] U.S. Cl. ...................... 360/4; 395/600; 364/DIG. 2
[58] Field of Search ................................. 395/275, 600; 360/4, 69, 71, 72.1, 72.2

[56] References Cited

U.S. PATENT DOCUMENTS

| | | | |
|---|---|---|---|
| 4,425,586 | 1/1984 | Miller | 358/335 |
| 4,841,387 | 6/1989 | Rindfuss | 360/72.1 |
| 4,924,387 | 5/1990 | Jeppesen | 364/409 |
| 5,311,207 | 5/1994 | Kusumoto et al. | 358/22 |

Primary Examiner—William M. Treat

[57] ABSTRACT

A note-taking system based on a notepad computer with an integrated audio/video-recorder is described. A document is created or retrieved. As the user types on the keyboard or writes with the stylus or similar input instrument, each character or stroke that is input by the user is invisibly time-stamped by the computer. The audio/video stream is also continuously time-stamped during recording. To play a section of recording back, the user selects part of the note (perhaps by circling it with a stylus) and invokes a "playback selection" command. The computer then examines the time-stamp and "winds" the record to the corresponding place in the audio/video recording, where it starts playing—so that the user hears and/or sees what was being recorded at the instant the selected text or strokes were input. With a graphical user interface, the user may input key "topic" words and subsequently place check marks by the appropriate word as the conversation topic veers into that neighborhood.

10 Claims, 2 Drawing Sheets

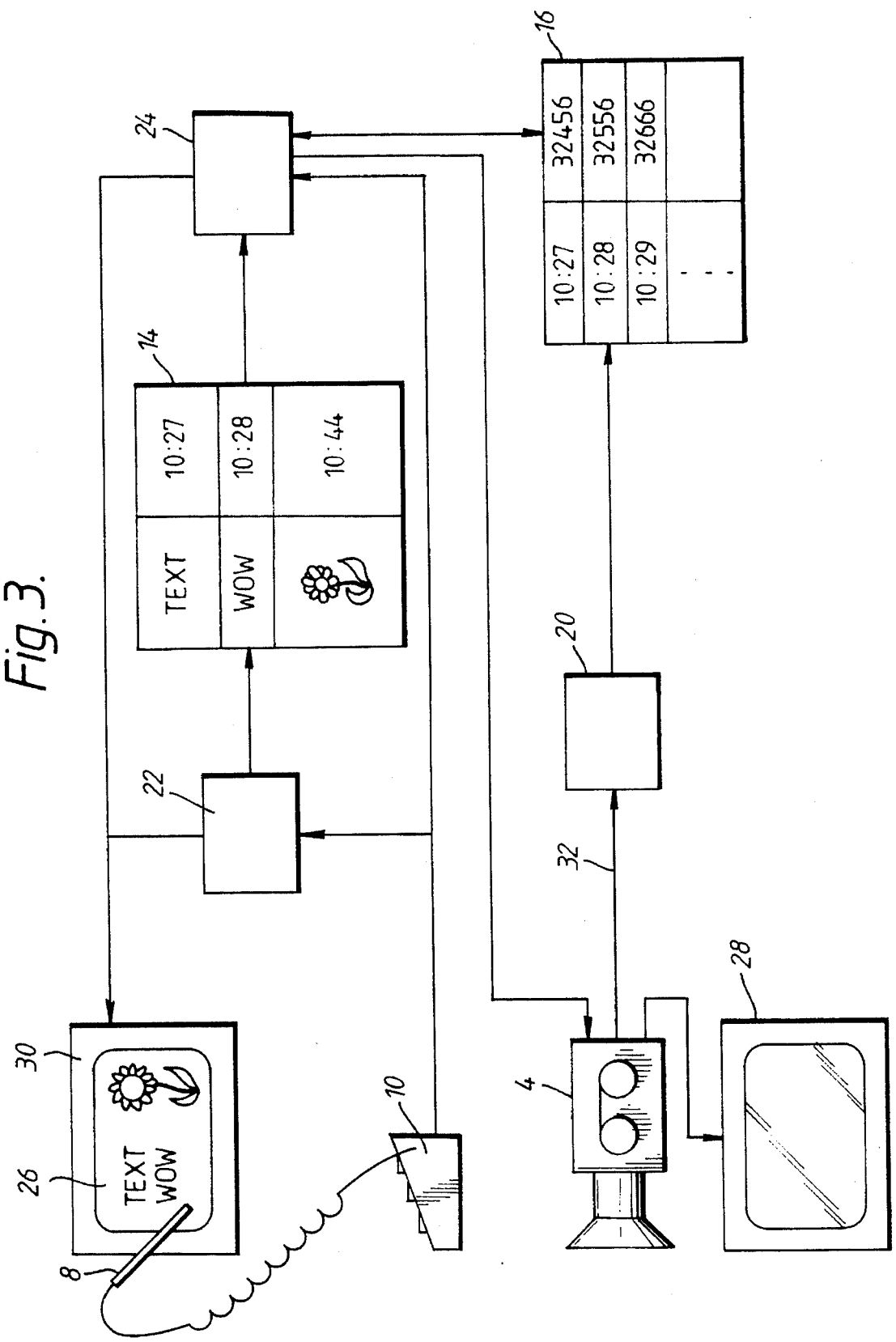

REAL TIME USER INDEXING OF RANDOM ACCESS TIME STAMP CORRELATED DATABASES

This is a continuation of application Ser. No. 07/819,258, filed Jan. 10, 1992 now abandoned.

This invention relates to a data access system, and in particular to one in which the taking of notes usually accompanies the recording of data. The notes themselves are used to gain selective access to the data.

The problem

At seminars, interviews or meetings, it has long been recognised that the simple act of taking notes helps the writer memorize key facts. On the other hand, to make a note, the listener has to divert attention from the speaker, figure out how to encode the information he has heard or the idea he has had, and then focus on writing it down. It doesn't seem surprising that the listener often loses the speaker's thread! Nowadays many people resort to making audio or video recordings of important events and then spending time transcribing key ideas afterwards. Locating the interesting parts of an audio or video recording is often very time-consuming and tedious, which reduces the likelihood that the listener will bother to transcribe the tape, or even bother to make the recording in the first place.

In many situations the need to record is not anticipated. Only after the event, sometimes long afterwards, does the need become evident. To overcome this problem it may eventually become technologically possible, from a storage point of view, to record and store every second of a person's working day. The problem of locating key pieces of information from this huge and expanding base of recordings becomes overwhelming.

This invention builds upon these ideas by providing a semi-automatic, fine-grained, audio/video indexing tool. Although the invention focuses on gaining access to audio and video records, it is not limited to this application. It is envisaged that the invention could also be applied to accessing files in a computer system, phone call records, or any other time-stamped data set.

The present invention will now be described by way of example with reference to the accompanying drawings, in which:

FIG. 3 is a diagrammatic view of one form of the architecture of the invention.

Figure 1:
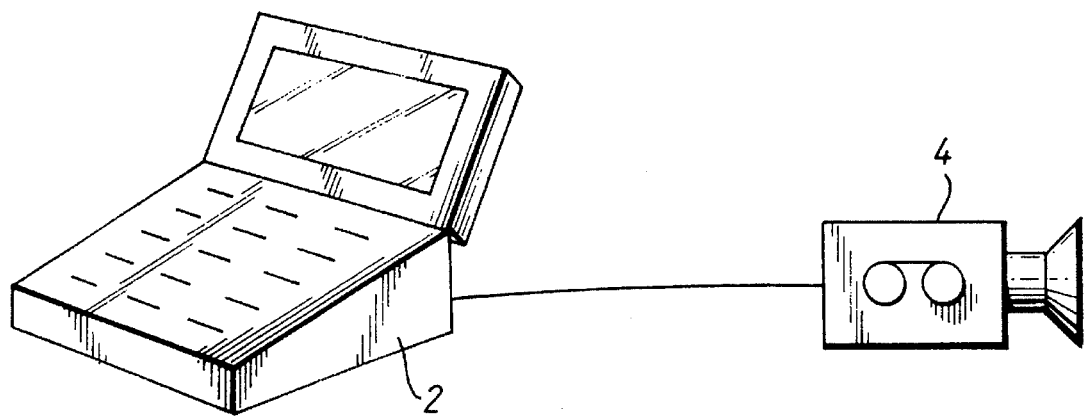
FIG. 1 is a diagrammatic view of one form of the invention using a laptop computer.

The example of the invention shown in FIG. 1 combines a laptop computer 2 with a video or audio recording device 4.

Figure 2:
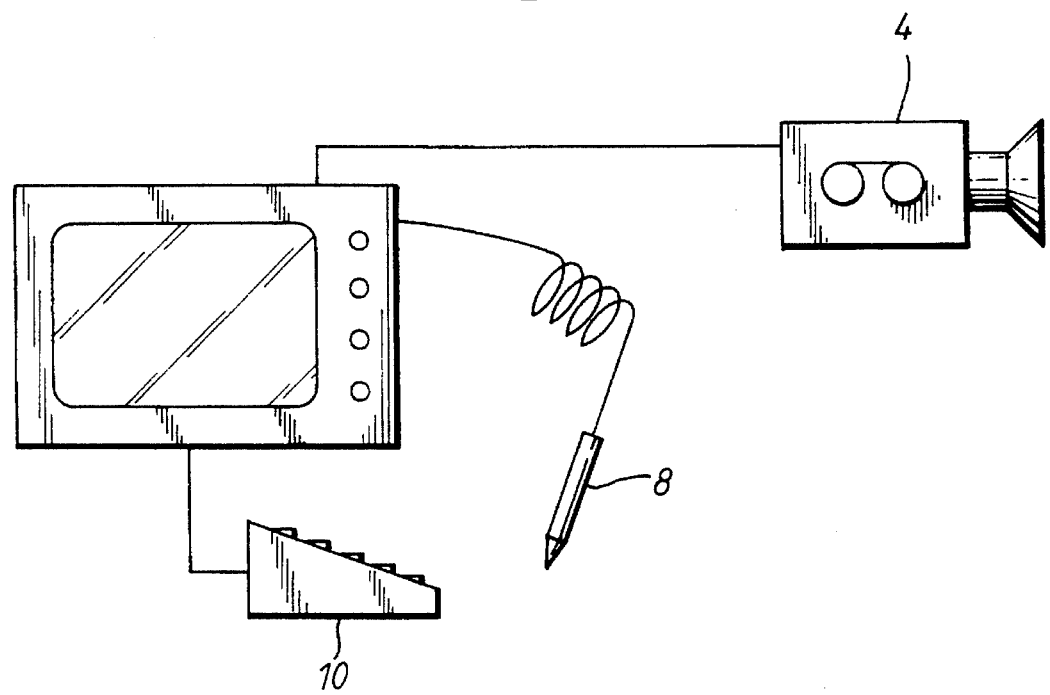
FIG. 2 is a diagrammatic view of another form of the invention using a notepad computer with stylus input.

In the example of the invention shown in FIG. 2, the portable computer is replaced by a note-pad computer 6 with stylus or other graphical input device 8, connected to video or audio recording device 4. The stylus input device may take the place of the keyboard of the portable computer as the user's means of input. Alternatively, a keyboard 10 may be connected to the notepad computer for input.

Either form of computer is interfaced to the recorder in such a manner that the computer can monitor the recorder's progress during recording. To enable this, the recorder may emit time-code or make other unique index information continuously available to the computer. Additionally the computer can operate the recorder directly, causing it to record, or play from a specific index point as required. In any situation it is possible for the computer to find out the time-code or index information.

In the general system shown in FIG. 3, the computer presents a document editor style user interface to the user. This interface may resemble that of a word-processor, an illustrator, or an application specific interface, depending on the user's needs and computer hardware. The user interface provides commands for creating a new document and starting and stopping recording.

A new document is created, or an old one recalled, and recording commences. The editor 22 allows the user to draw, type or sketch on the blank document using keyboard 10, stylus 8, or other graphical input device. As each mark (or indicium) 26, is added to the document (an 'indicium' is any indivisible displayable symbol created by the interface, e.g. pen-stroke, character, graphical symbol, etc.), the editor time-stamps and stores it in an indicium-to-timestamp index 14. The video-frame time-stamper 20 also continuously notes the index information 32 arriving from the recorder 4 at that instant, and time-stamps it and stores it in a timestamp-to-timecode index 16. The time-stamps are not visible to the user—they are stored with the computer's internal representation of the indicia. When the session is over, the user stores away the document; the contents of the two indexes, and the recording for subsequent use. Any method that allows timestamps to be used as an index into the recording may be used instead of the timestamp-to-timecode index, e.g. interpolation of the timecode itself.

When the user wants to recall sections of the recording, the appropriate related document is retrieved and recalled to the display 30 by the browser 24. Using the stylus 8, or the keyboard 10, the user selects one or more indicia on the document, perhaps by circling them, positioning a cursor, or typing an identifying name, and instructs the browser 24 to play the associated video section. The browser 24 identifies the selected indicium or indicia, looks up the time-stamp(s) in the indicium-to-timestamp index 14; looks up the timestamp(s) in the timestamp-to-timecode index 16, and plays the section of the recording in the area indicated by the resultant timecode. Thus the user sees what was recorded at the time the marks were made on the video monitor 28.

Indicium-to-timestamp and timestamp-to-timecode indices may be combined into a single indicium-to-timecode index. It is expected that users will develop shorthand notations for marking the document to indicate an interesting idea, change of topic or speaker, and so forth. It also is expected that users will type or handwrite key words as the topic arises, and then add additional marks nearby each time the subject veers in the direction of that topic. Thus, to hear all sections of a seminar associated with the same topic, it is necessary only to circle all the marks in the location of the topic keyword.

Accordingly it will be seen that the present invention provides a simple, inexpensive, lightweight, low-power device for quick access to data records.

I claim:

1. A system for providing random access to a data set, preferably an audio and/or video data set, comprising:

means, including a user interface, for capturing of said indicia hand generated by a user during a serial rendition of said data set so that each indicium is time correlated with a respective part of said data set, such indicia being available for subsequent selection by a user; and means for indexing into said data set to identify the part thereof that is time correlated with any indicium a user selects from said indicia; said system being characterized by including.

means for automatically time-stamping each indicium upon its generation by the user, and means for automatically time-stamping the part of said data set with which said indicium is time correlated substantially concurrently with the time-stamping of said indicium, with all such time-stamping being referenced to a common time base;

means for automatically storing, retrieving and displaying said user-generated indicia; and means for determining the time-stamp of each user-selected indicium for use by said indexing means;

said user interface being adapted for electronically both capturing and displaying said user generated indicia.

2. The system according to claim 1, wherein said indexing means includes means for identifying the part of the data set having the same time-stamp as that determined by the determining means.

3. The system according to claim 1, wherein the determining means includes a look-up table of indicia and corresponding time stamp information.

4. The system according to claim 2, wherein the determining means includes a look-up table of indicia and corresponding time stamp information.

5. A system according to claim 3, wherein the identifying means includes a look-up table of time-stamp information and corresponding data reference information.

6. A system according to claim 4, wherein the identifying means includes a look-up table of time-stamp information and corresponding data reference information.

7. A system according to claim 6, wherein said data set and said look-up tables are stored in separate storage means.

8. A system according to claims 1–7, further including a reproduction device for reproducing the identified part of said data set.

9. A system according to claim 8, including means for commanding the reproduction device to reproduce said identified part, commencing with the video frame corresponding to the time stamp of the selected indicia.

10. A system according to claim 8, wherein said data reference information comprises field numbers and/or time-codes.

* * * * *